United States Patent
Dua et al.

(10) Patent No.: US 12,504,882 B2
(45) Date of Patent: Dec. 23, 2025

(54) RECLAIM PACKAGE CACHE FOR THERMAL THROTTLING

(71) Applicant: SANDISK TECHNOLOGIES, INC., Milpitas, CA (US)

(72) Inventors: Udita Dua, Bangalore (IN); Kalpit Bordia, Bengaluru (IN)

(73) Assignee: SANDISK TECHNOLOGIES, INC., Milpitas, CA (US)

(*) Notice: Subject to any disclaimer, the term of this patent is extended or adjusted under 35 U.S.C. 154(b) by 114 days.

(21) Appl. No.: 18/237,096

(22) Filed: Aug. 23, 2023

(65) Prior Publication Data
US 2024/0370174 A1   Nov. 7, 2024

Related U.S. Application Data

(60) Provisional application No. 63/463,732, filed on May 3, 2023.

(51) Int. Cl.
G06F 3/06 (2006.01)

(52) U.S. Cl.
CPC .......... G06F 3/0614 (2013.01); G06F 3/0634 (2013.01); G06F 3/0673 (2013.01)

(58) Field of Classification Search
CPC ..... G06F 3/0653; G06F 3/0656; G06F 3/0634
See application file for complete search history.

(56) References Cited

U.S. PATENT DOCUMENTS

| | | | |
|---|---|---|---|
| 9,152,568 B1 | 10/2015 | Seigler | |
| 9,442,816 B2 | 9/2016 | Cordero | |
| 10,846,010 B2 | 11/2020 | Gwin | |
| 2015/0378642 A1* | 12/2015 | Moon | G06F 3/0619 |
| | | | 711/162 |
| 2016/0334992 A1* | 11/2016 | Yashiro | G06F 3/0614 |
| 2019/0033933 A1 | 1/2019 | Hur | |
| 2019/0050153 A1* | 2/2019 | Yang | G06F 3/0679 |
| 2021/0240617 A1* | 8/2021 | Rao | G06F 12/08 |
| 2022/0012141 A1* | 1/2022 | Kim | G06F 11/2015 |

OTHER PUBLICATIONS

"Any use for a 1TB SSD with a bunch of bad blocks?" 1 page, posted 2021 [retrieved on Feb. 4, 2025] by user "angry_dingo". Retrieved from Internet: <https://www.reddit.com/r/DataHoarder/comments/j5rps1/any_use_for_a_1tb_ssd_with_a_bunch_of_bad_blocks/> (Year: 2021).*

* cited by examiner

Primary Examiner — Tim T Vo
Assistant Examiner — Christian Joseph O'Connell
(74) Attorney, Agent, or Firm — Arlene Neal; NEAL BLIBO LLC

(57) ABSTRACT

A storage device is communicatively coupled to a host that stores data on a primary memory package on the storage device. A controller on the storage device may monitor the temperature of components on the storage device and determine when the temperature exceeds a thermal temperature limit. When the temperature exceeds a thermal temperature limit, the controller may suspend certain operations on the primary memory package and write host data to the secondary memory package on the storage device. The controller may continue to monitor the temperature on the storage device, determine when the temperature on the storage device returns to an acceptable level, transfer data from the secondary memory package to the primary memory package, and resume writing host data to primary memory package.

20 Claims, 7 Drawing Sheets

RECLAIM PACKAGE CACHE FOR THERMAL THROTTLING

CROSS-REFERENCE TO RELATED APPLICATION

The present application claims the benefit of U.S. Provisional Application Ser. No. 63/463,732 titled "RECLAIM PACKAGE CACHE FOR THERMAL THROTTLING," filed May 3, 2023, which is incorporated by reference herein in its entirety.

BACKGROUND

Non-volatile storage devices, such as solid-state drives (SSD) and the like, may include one or more memory devices for storing data and a controller for managing the internal operations of the storage device. A memory device may be divided into blocks, wherein multiple blocks may form a plane, one or more planes may form a die, and one or more dies may be included in a package.

As technology improves, even if the size and form of the storage device remain the same, the memory devices and/or the interfaces on the storage device may run faster, thus improving the performance of the storage device. Better performance may cause the storage device to draw more power which may result in thermal issues, wherein the temperature of the storage device may exceed a predefined operating temperature. When the temperature of the storage device exceeds the operating temperature, the controller may execute a throttling mechanism by either reducing the frequency of operations carried out by components on the storage device or reducing the operational power of components on the storage device.

In one throttling approach, the controller may monitor the temperature of components on the storage device, including, for example, the temperature of the controller, the temperature of the memory devices, and the temperature of a power management unit on the storage device. The controller may determine if the highest temperature from the components exceeds a thermal temperature limit (for example, a temperature above the predefined operating temperature). If it does, the controller may reduce the number of parallel operations being performed to allow for less power consumption so that the storage device can cool down to a temperature that is below the thermal temperature limit.

In another approach, the controller may be aware of the amount of power used for each operation and may count the number of operations being performed on a die. If the temperature on the storage device exceeds the thermal temperature limit, the controller may reduce the number of operations being performed on the die by controlling the amount of power to the die. This may allow for less power consumption so that the storage device can cool down to a temperature that is below the thermal temperature limit.

In another approach, if the temperature on the storage device exceeds the thermal temperature limit, the controller may use fewer dies and/or communications channels or the controller may route data to one or more specific dies in a package and then toggle between these dies based on workload. With this approach, the storage device may continue to consume power which may result in heat dissipation on the packages on the storage device. The host performance may be lower, for example, when performing synchronization. None of the current approaches performs thermal throttling while maintaining the operational frequency and power.

SUMMARY

In some implementations, a storage device communicatively coupled to a host performs thermal throttling while maintaining operational frequency and power. The storage device may include a primary memory package to store data, a secondary memory package to store data, and a controller. The controller may receive instructions from the host and write data to the primary memory package. The controller may also monitor the temperature of components on the storage device and determine when the temperature exceeds a thermal temperature limit. When the temperature exceeds a thermal temperature limit, the controller may suspend certain operations on the primary memory package and write host data to the secondary memory package. The controller may continue to monitor the temperature on the storage device, determine when the temperature on the storage device returns to an acceptable level, transfer data from the secondary memory package to the primary memory package, and resume suspended operations on the primary memory package.

In some implementations, a method is provided for performing thermal throttling on a storage device while maintaining operational frequency and power. The method includes receiving instructions from the host and writing data to the primary memory package. The method also includes monitoring the temperature of components on the storage device and determining when the temperature exceeds a thermal temperature limit. When the temperature exceeds a thermal temperature limit, the method includes suspending certain operations on the primary memory package and writing host data to the secondary memory package. The method further includes determining when the temperature on the storage device returns to an acceptable level, transferring data from the secondary memory package to the primary memory package. and resuming suspended operations on the primary memory package.

In some implementations, a non-transitory computer-readable medium is provided to store one or more instructions, when executed by one or more processors of the storage device, may cause the one or more processors to receive instructions from a host, write data to a primary memory package on the storage device, monitor the temperature of components on the storage device, and determine when the temperature exceeds a thermal temperature limit. When the temperature exceeds a thermal temperature limit, the processor may suspend certain operations on the primary memory package and write host data to a secondary memory package on the storage device. The processor may further determine when the temperature on the storage device returns to an acceptable level, transfer data from the secondary memory package to the primary memory package, and resume suspended operations on the primary memory package.

Figure 1:
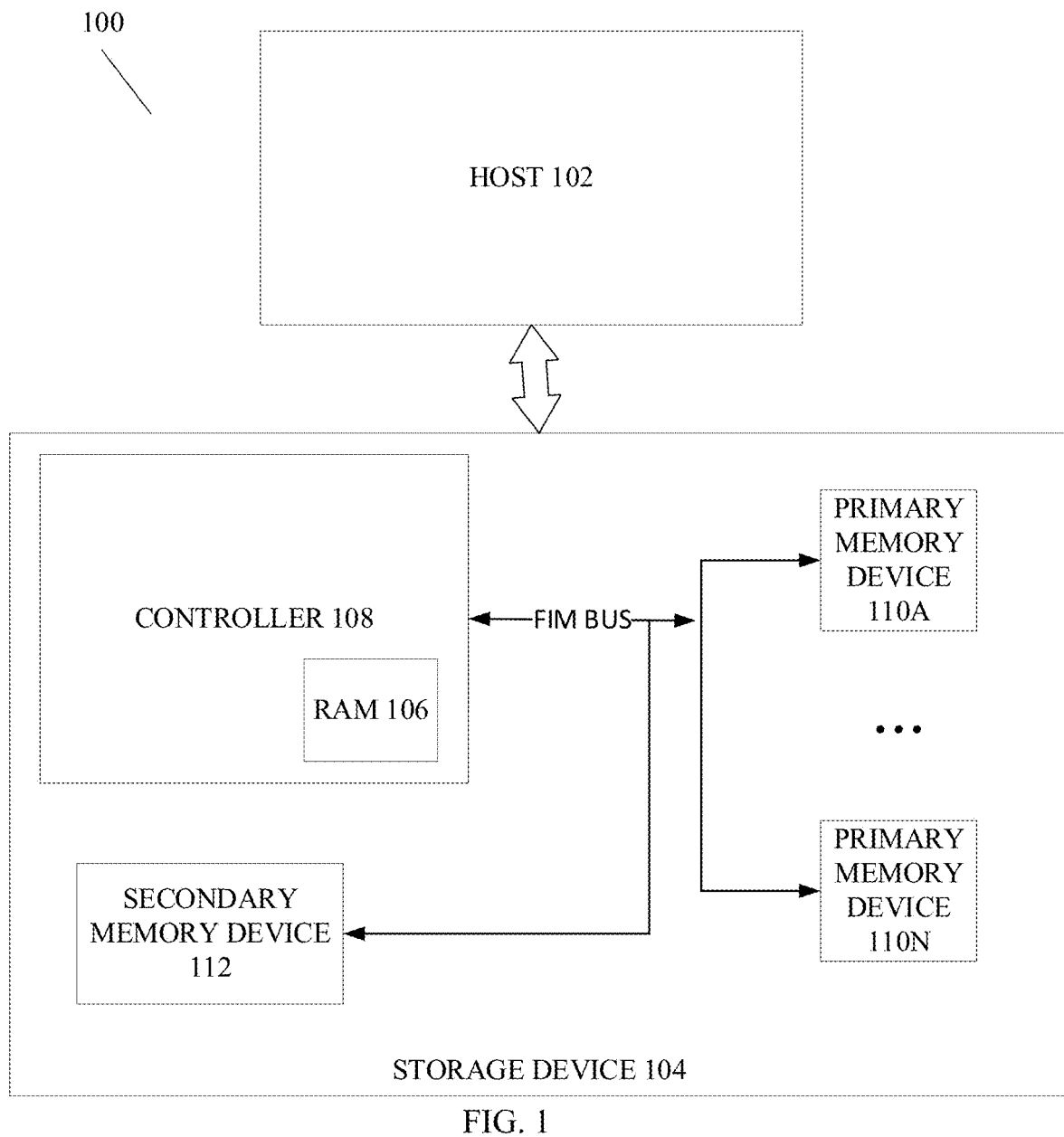
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110n (referred to herein as the primary memory device(s) 110 or primary memory package(s) 110), and one or more non-volatile memory devices 112 (referred to herein as the secondary memory device(s) 112 or secondary memory package(s) 112). Storage device 104 may be, for example, a solid-state drive (SSD), and the like. RAM 106 may be temporary storage such as a dynamic RAM (DRAM) that is used in storage device 104.

Controller 108 may interface with host 102 and process foreground operations including instructions transmitted from host 102. For example, controller 108 may read data from and/or write to primary memory device 110 based on instructions received from host 102. Controller 108 may also execute background operations to manage resources on primary memory device 110. For example, controller 108 may monitor primary memory device 110 and may execute garbage collection and other relocation functions per internal relocation algorithms to refresh and/or relocate the data on primary memory device 110.

Primary memory device 110 may be flash based. For example, primary memory device 110 may be a NAND flash memory that may be used for storing host and control data over the operational life of primary memory device 110. Primary memory device 110 may be included in storage device 104 or may be otherwise communicatively coupled to storage device 104.

Secondary memory device 112 may also be flash memory. Secondary memory device 112 may be used as a transient cache and may have reduced reliability and program erase cycle (PEC) requirements. The size of secondary memory device 112 may be a fraction of the overall size of primary memory device 110. For example, if the size of primary memory device 110 is 1 Terabytes (TB), the size of secondary memory device 112 may be 8 Gigabytes (GB), if the size of primary memory device 110 is 2 TB, the size of secondary memory device 112 may be 16 GB, and so on, such that the size of secondary memory device 112 may be any size that may scale to align with the overall capacity of primary memory device 110.

In some implementations, secondary memory device 112 may be a reclaimed memory device such as a NAND with a manufacturing defect. Memory devices with manufacturing defects may have different types of defects, wherein not all blocks may have defects and good/functional blocks may be filtered out. In some cases, the functional blocks may not be sufficient to provide the full capacity needed from the memory device. For example, on a 512 GB memory device, 100 functional blocks may be needed for a product. However, due to manufacturing defects, the memory device may have only 10 functional blocks. Since the memory device cannot be used for a product, the memory device may be reclaimed and used as a secondary memory device 112.

In some cases, the blocks on a memory device may not have manufacturing defects but these blocks may not meet predefined performance or reliability requirements. For example, these blocks may not meet programming requirements such as programming within a certain amount of time. Such a memory device may also be used as a secondary memory device 112. In some implementations, memory devices with or without defects may be used as secondary memory devices 112. Hence with minimal cost, secondary memory device 112 may be added to storage device 104 and can help reduce the thermal materials, especially for external SSD-like utilization.

Data may be stored on memory devices 110 and 112 in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. As such, data may be stored in an SLC format faster than, for example, in TLC/QLC formats. Data may also be stored in the SLC format in a more power-efficient manner as this format uses power in smaller bursts of time than, for example, in TLC/QLC formats.

Controller 108 may monitor the temperature of components on storage device 104, including, for example, its temperature and the temperature of primary memory devices 110. When controller 108 determines that the temperature of storage device 104 exceeds a predefined thermal temperature limit (for example, a predefined operating temperature above which the reliability of the data stored on the memory device may be affected), controller 108 may execute a thermal throttling mechanism. Controller 108 may suspend program/erase/write operations on primary memory device 110 and may cache host write data on secondary memory device 112. Controller 108 may write the host data to secondary memory device 112 in SLC mode. Controller 108 may offset data reliability concerns when writing host data to secondary memory device 112 by executing one or more reliability schemes on secondary memory device 112. For example, controller 108 may execute one or more reliability schemes such as Dual-Write, Reduced Trim/TM mode, XOR, Erase-Retry, Program-Fail re-verify for slow programs, etc. The reliability scheme(s) selected for use on secondary memory device 112 may be based on the defects associated with secondary memory device 112.

While caching data on secondary memory device 112, controller 108 may continue to monitor the temperature on storage device 104. When the temperature on storage device 104 returns an acceptable level (for example, a predefined operational level that is below the thermal temperature limit), controller 108 may transfer the data from secondary memory device 112 to primary memory device 110. Controller 108 may transfer the data from secondary memory device 112 to primary memory device 110 using, for example, a valid data relocation scheme, wherein if controller 108 writes host data to a logical address in secondary memory device 112 and rewrites the host data to secondary memory device 112, controller 108 may transfer the rewritten host data from secondary memory device 112 to primary memory device 110. Using the valid data relocation scheme, controller 108 may improve write amplification on primary memory device 110.

In some cases, controller 108 may perform blind data movement when transferring the data from secondary memory device 112 to primary memory device 110. With the blind data movement, controller 108 may transfer all data cached in secondary memory device 112 to primary memory device 110. Controller 108 may use a cache coherency scheme when transferring data cached in secondary memory device 112 to primary memory device 110.

During thermal throttling, when controller 108 is caching host write data in secondary memory device 112, controller 108 may continue to execute host read operations from primary memory device 110. If host 102 instructs controller 108 to read data that is cached on secondary memory device 112, controller 108 may read the data from secondary memory device 112 until the cached data is transferred to primary memory device 110. Thereafter, controller 108 may read the data from primary memory device 110.

Secondary memory device 112 may be powered down when the temperature on storage device 104 is at a predefined operational level (for example, a temperature level that is below the thermal temperature limit). Secondary memory device 112 may be enabled during thermal throttling to avoid increasing the power consumption on storage device 104. In cases where the PEC of secondary memory device 112 is exhausted, thermal throttling to secondary memory device 112 may be disabled.

Based on, for example, thermal simulations, secondary memory package 112 may be placed at an optimum distance from controller 108 and/or primary memory devices 110 so that heat dissipation from secondary memory package 112 may not impact controller 108 and/or primary memory devices 110.

Storage device 104 may perform these processes based on a processor, for example, controller 108 executing software instructions stored by a non-transitory computer-readable medium. As used herein, the term "computer-readable medium" refers to a non-transitory memory device. Software instructions may be read into the memory device from another computer-readable medium or from another device. When executed, software instructions stored in the memory device may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, host 102 and/or storage device 104 may include additional components, fewer components, different components, or differently arranged components than those shown in FIG. 1. Additionally, or alternatively, a set of components (e.g., one or more components) of host 102 and/or storage device 104 may perform one or more functions described as being performed by another set of components of host 102 and/or storage device 104.

Figure 2A:
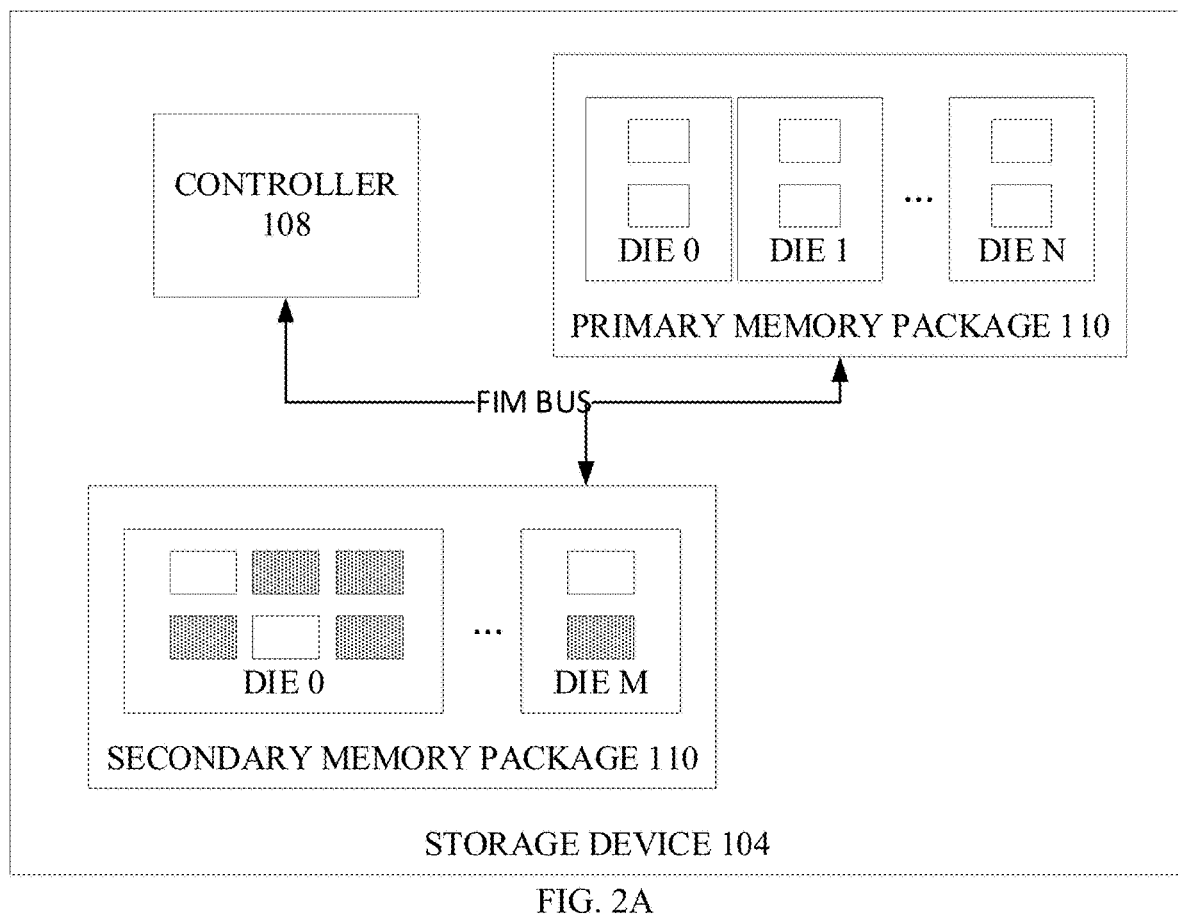
FIGS. 2A-2D are schematic block diagrams of an example storage device before, during, and after thermal throttling in accordance with some implementations.

FIGS. 2A-2D are schematic block diagrams of an example storage device before, during, and after thermal throttling in accordance with some implementations. FIG. 2A shows an example of storage device 104 including a primary memory package 110 including multiple dies (i.e., Die 0-Die N). Storage device 104 also includes a secondary memory package 112 including multiple dies (i.e., Die 0-Die M), wherein the dies in secondary memory package 112 include nonfunctional blocks, shown as shaded blocks. Controller 108 may utilize an existing Flash Interface Module (FIM) bus and multiplex primary memory package 110 and secondary memory package 112, with only minimal hardware change to support the multiple packages.

Figure 2B:
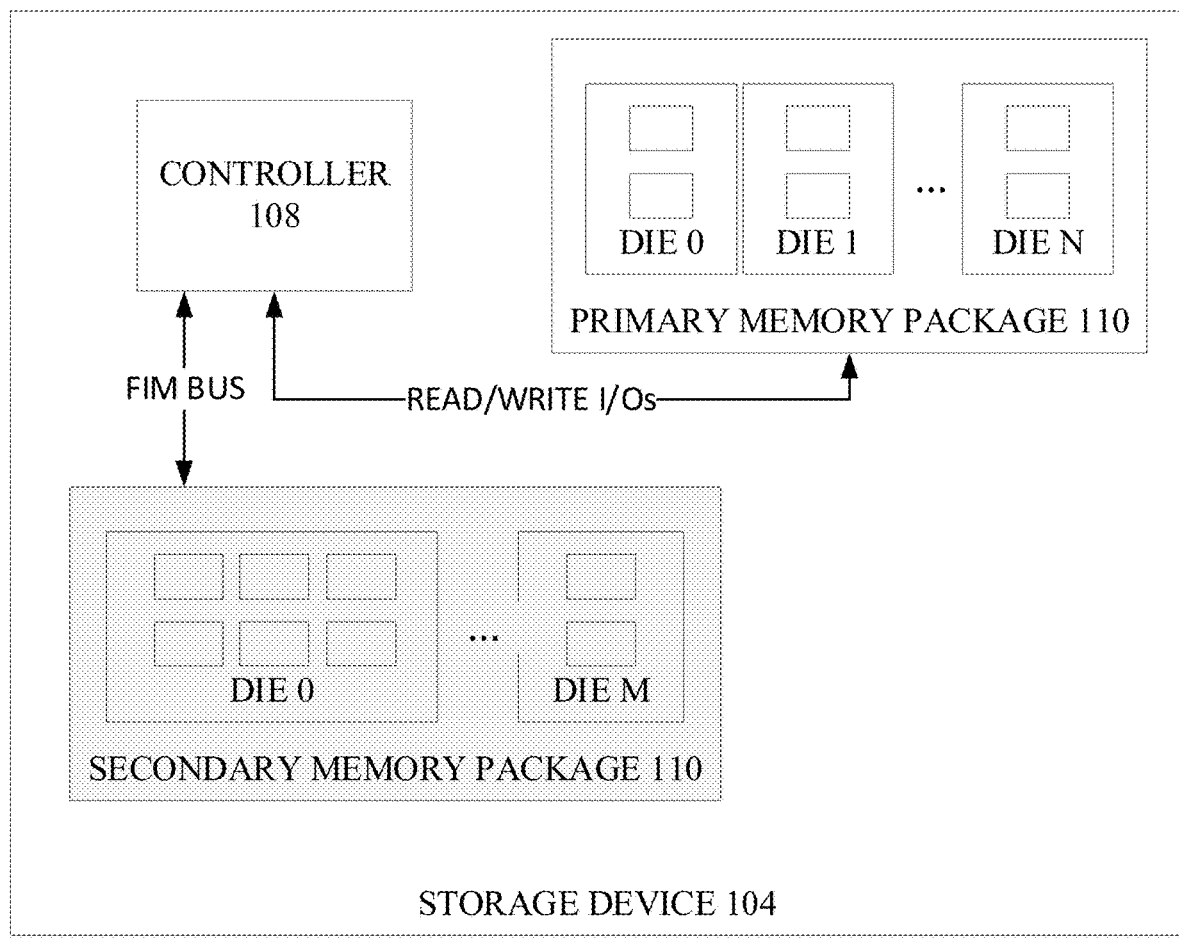

FIG. 2B shows storage device 104 during normal operating temperatures (i.e., before or post thermal throttling). Secondary memory package 112 may be powered down and all read and write input/output (I/O) operations may be carried out on primary memory package 110. FIG. 2B shows separate buses from controller 108 to primary memory package 110 and secondary memory package 112, for the sake of clarity and to show that controller 108 is reading from and writing to primary memory package 110.

Figure 2C:
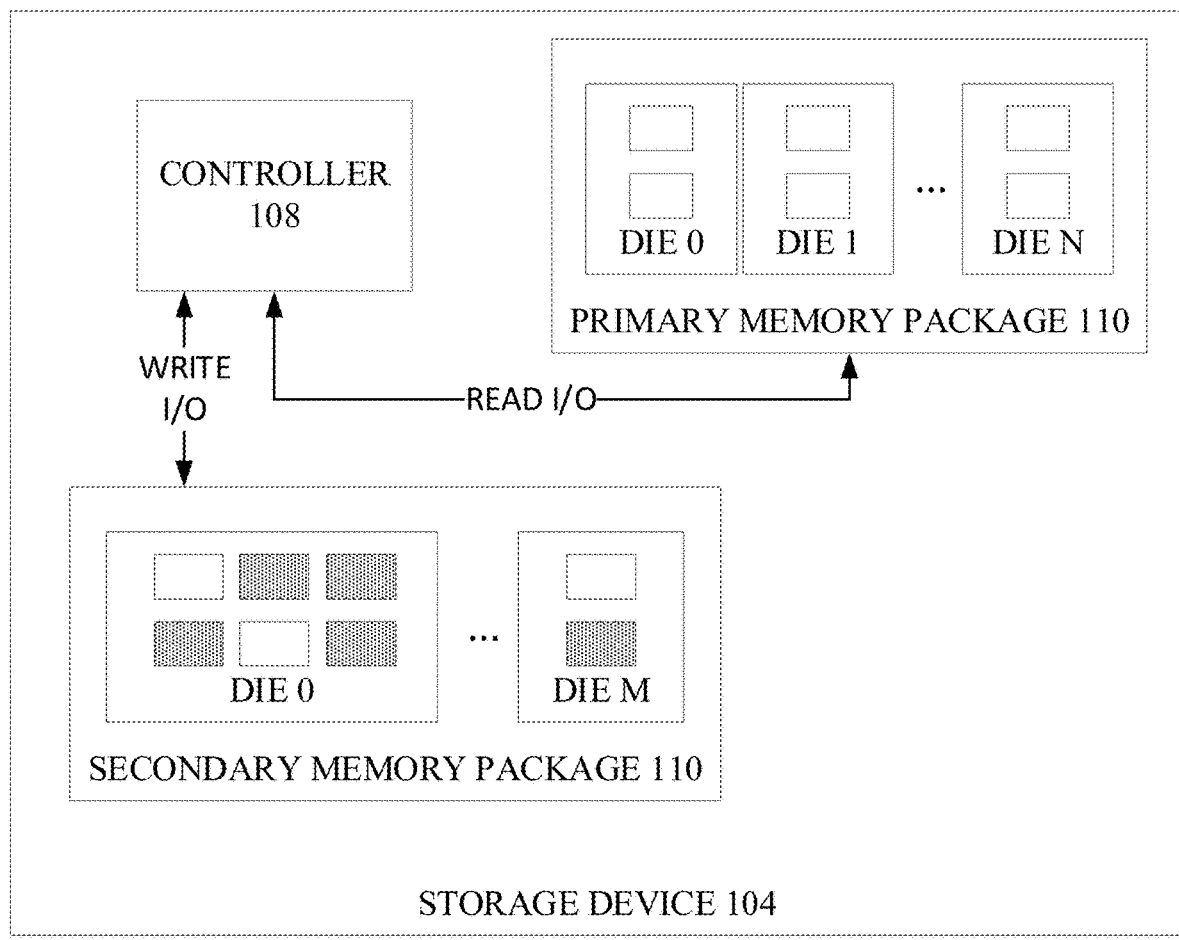

FIG. 2C shows storage device 104 during thermal throttling. Controller 108 may write host data to secondary memory package 112 and may read host data from primary memory package 110 during thermal throttling. If host 102 instructs controller 108 to read data that is cached on secondary memory package 112, controller 108 may read the data from secondary memory package 112 until the cached data is transferred to primary memory package 110.

Figure 2D:
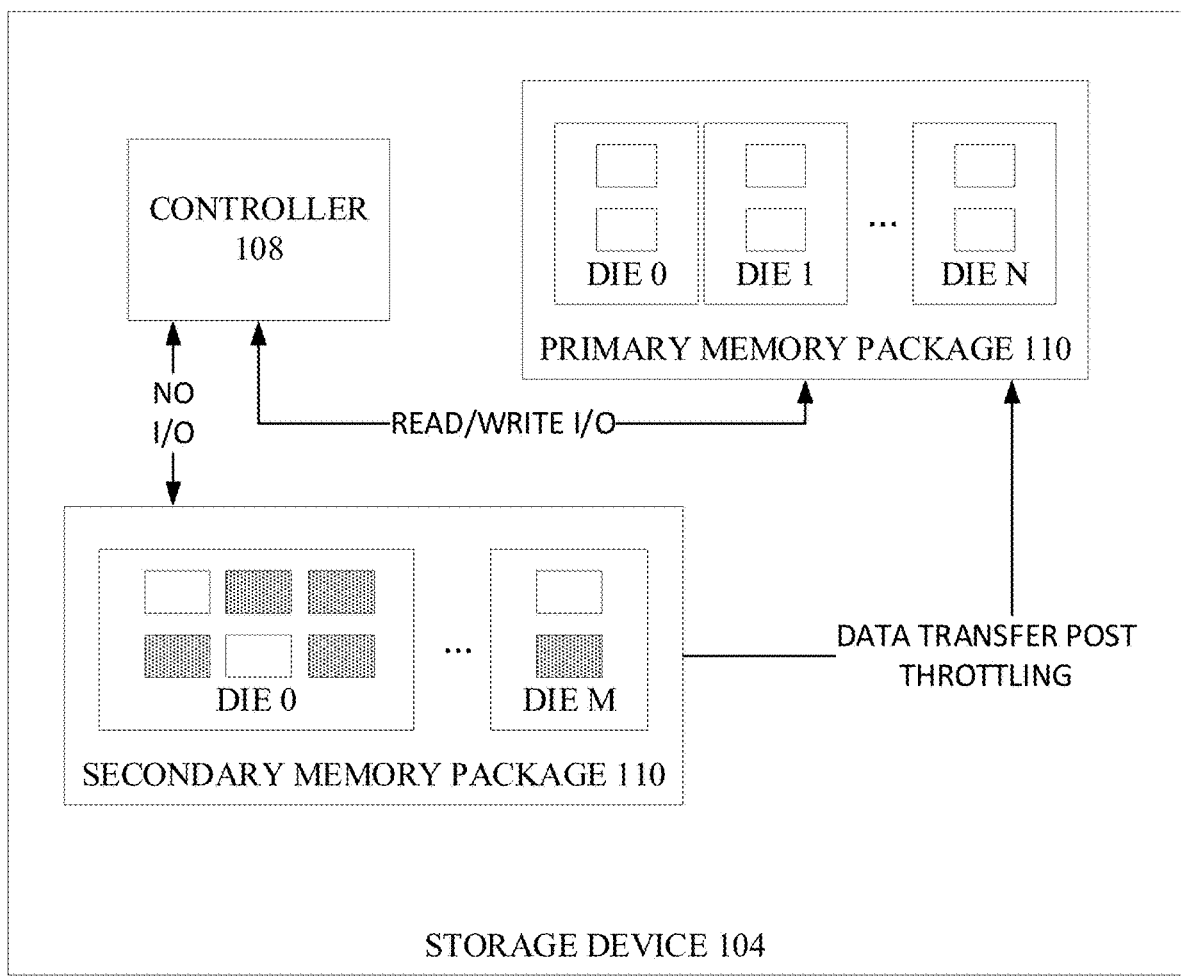

FIG. 2D shows storage device 104 after thermal throttling. Controller 108 may read host data from and write host data to primary memory package 110. Controller 108 may also transfer data cached in secondary memory package 112 using, for example, a valid data relocation scheme or a blind data movement scheme. When the cache data is transferred from secondary memory package 112 to primary memory package 110, controller 108 may power down secondary memory package 112 to a state shown in FIG. 2B. As indicated above FIGS. 2A-2D are provided as examples. Other examples may differ from what is described in FIGS. 2A-2D.

Figure 3:
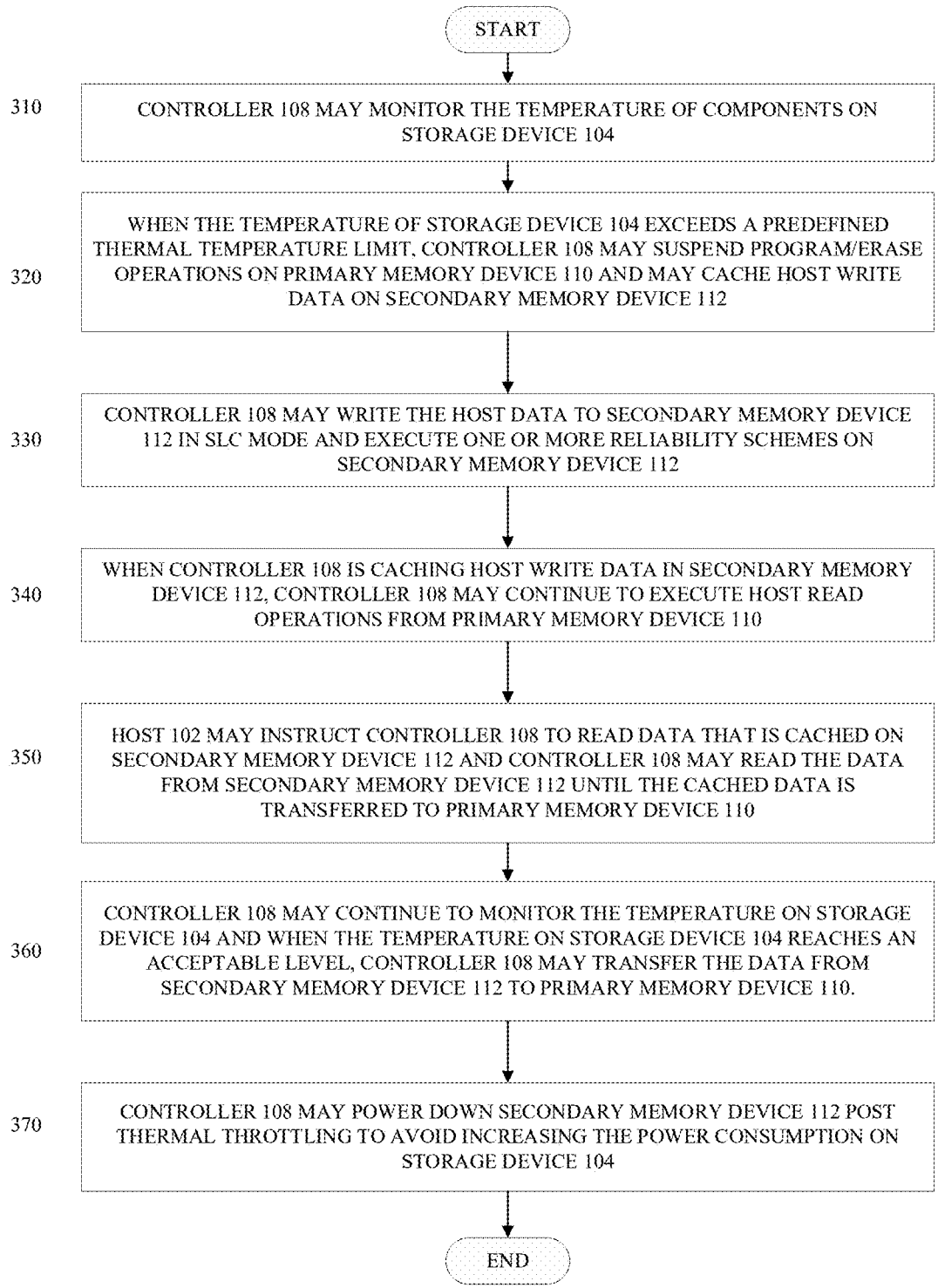
FIG. 3 is a flow diagram of an example process for performing thermal throttling without reducing operational frequency and/or power in accordance with some implementations.

FIG. 3 is a flow diagram of an example process for performing thermal throttling without reducing operational frequency and/or power in accordance with some implementations. At 310, controller 108 may monitor the temperature of components on storage device 104. At 320, when the temperature of storage device 104 exceeds a predefined thermal temperature limit, controller 108 may suspend program/erase operations on primary memory device 110, and may cache host write data on secondary memory device 112. At 330, controller 108 may write the host data to secondary memory device 112 in SLC mode and execute one or more reliability schemes on secondary memory device 112. At 340, when controller 108 is caching host write data in secondary memory device 112, controller 108 may continue to execute host read operations from primary memory device 110. At 350, host 102 may instruct controller 108 to read data that is cached on secondary memory device 112, and controller 108 may read the data from secondary memory device 112 until the cached data is transferred to primary memory device 110. At 360, controller 108 may continue to monitor the temperature on storage device 104 and when the temperature on storage device 104 reaches an acceptable level, controller 108 may transfer the data from secondary memory device 112 to primary memory device 110. At 370, controller 108 may power down secondary memory device 112 post thermal throttling to avoid increasing the power consumption on storage device 104.

Figure 4:
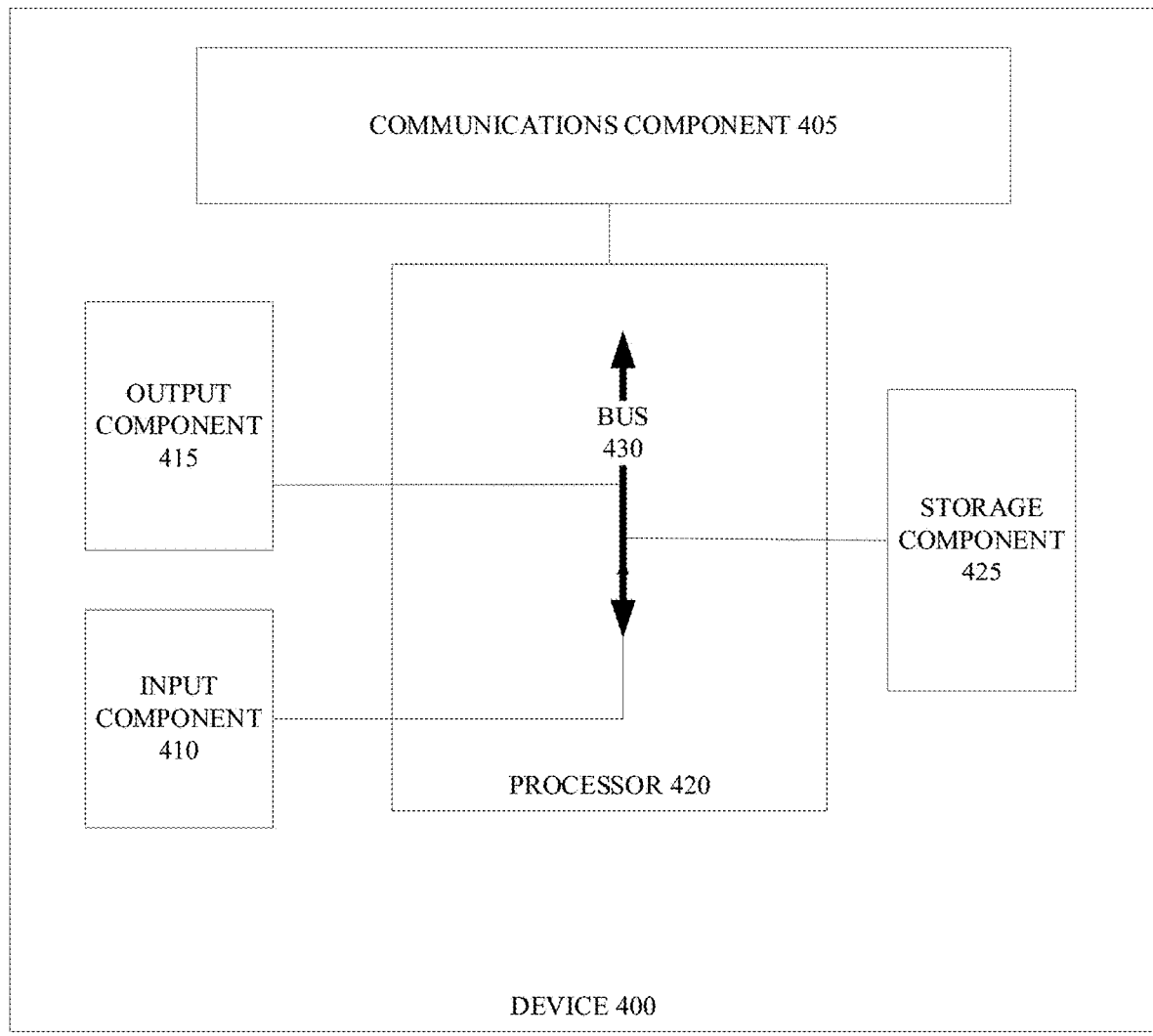
FIG. 4 is a diagram of example components of the host of FIG. 1.

FIG. 4 is a diagram of example components of one or more devices of FIG. 1. In some implementations, host 102 may include one or more devices 400 and/or one or more components of device 400. Device 400 may include, for example, a communications component 405, an input component 410, an output component 415, a processor 420, a storage component 425, and a bus 430. Bus 430 may include components that enable communication among multiple components of device 400, wherein components of device 400 may be coupled to be in communication with other components of device 400 via bus 430.

Input component 410 may include components that permit device 400 to receive information via user input (e.g., keypad, a keyboard, a mouse, a pointing device, a microphone, and/or a display screen), and/or components that permit device 400 to determine the location or other sensor information (e.g., an accelerometer, a gyroscope, an actuator, another type of positional or environmental sensor). Output component 415 may include components that provide output information from device 400 (e.g., a speaker, display screen, and/or the like). Input component 410 and output component 415 may also be coupled to be in communication with processor 420.

Processor 420 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 may include one or more processors capable of being programmed to perform a function. Processor 420 may be implemented in hardware, firmware, and/or a combination of hardware and software.

Storage component 425 may include one or more memory devices, read-only memory (ROM), and/or another type of dynamic or static storage device (e.g., a flash memory, a magnetic memory, and/or optical memory) that stores information and/or instructions for use by processor 420. A memory device may include memory space within a single physical storage device or memory space spread across multiple physical storage devices. Storage component 425 may also store information and/or software related to the operation and use of device 400. For example, storage component 425 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 405 may include a transceiver-like component that enables device 400 to communicate with other devices, such as via a wired connection, a wireless connection, or a combination of wired and wireless connections. The communications component 405 may permit device 400 to receive information from another device and/or provide information to another device. For example, communications component 405 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 405 may also include one or more broadband and/or narrowband transceivers and/or other similar types of wireless transceiver configurable to communicate via a wireless network for infrastructure communications. Communications component 405 may also include one or more local area network or personal area network transceivers, such as a Wi-Fi transceiver or a Bluetooth transceiver.

Device 400 may perform one or more processes described herein. For example, device 400 may perform these processes based on processor 420 executing software instructions stored by a non-transitory computer-readable medium, such as storage component 425. As used herein, the term "computer-readable medium" refers to a non-transitory memory device. Software instructions may be read into storage component 425 from another computer-readable medium or from another device via communications component 405. When executed, software instructions stored in storage component 425 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device communicatively coupled to a host, wherein the storage device performs thermal throttling while maintaining operational frequency and power, the storage device comprises:
    a primary memory package in a first memory device to store data;
    a secondary memory package in a second memory device to store data, the second memory device being a separate memory device from the first memory device and the second memory device having characteristics that are different from characteristics of the first memory device; and
    a controller configured to:
        receive instructions from the host and write data to the primary memory package;
        to monitor temperature of components on the storage device and determine when the temperature exceeds a thermal temperature limit;
        when the temperature exceeds a thermal temperature limit, suspend certain operations on the primary memory package and write host data to the secondary memory package; and
        determine when the temperature on the storage device returns to a predefined operational level, transfer data from the secondary memory package to the primary memory package and resume suspended operations on the primary memory package.

2. The storage device of claim 1, wherein a size of the secondary memory package is a fraction of a size of the primary memory package, wherein the size of the secondary memory package scales to align with the size of the primary memory package.

3. The storage device of claim 1, wherein the secondary memory package is a reclaimed memory device with defective blocks and functional blocks.

4. The storage device of claim 1, wherein the secondary memory package is a reclaimed memory device with blocks that fail to meet predefined performance requirements.

5. The storage device of claim 1, wherein during thermal throttling, the controller stores data on the secondary memory package in a single-layer cell format.

6. The storage device of claim 1, wherein the controller executes one or more reliability schemes on the secondary memory package.

7. The storage device of claim 1, wherein the controller monitors the temperature of the controller, the temperature of the primary memory package, and the temperature of a power management unit on the storage device.

8. The storage device of claim 1, wherein the certain operations include program, erase, and write operations.

9. The storage device of claim 1, wherein the controller transfers the data from the secondary memory package to the primary memory package using one of a valid data relocation scheme and blind data movement scheme.

10. The storage device of claim 1, wherein when the temperature exceeds the thermal temperature limit, the controller reads host data from the primary memory package and reads host data, that is not transferred from the secondary memory package to the primary memory package, from the secondary memory package.

11. The storage device of claim 1, wherein the secondary memory package is powered down when the temperature on the storage device is at a predefined operational level.

12. A method for performing thermal throttling on a storage device while maintaining operational frequency and power, the storage device is communicatively coupled to a host and the store device comprises a primary memory package to store data, a secondary memory package to store data, and a controller to process data, the method comprising:
    receiving instructions from the host and writing data to the primary memory package in a first memory device;
    monitoring temperature of components on the storage device and determining when the temperature exceeds a thermal temperature limit;
    when the temperature exceeds a thermal temperature limit, suspending certain operations on the primary memory package and writing host data to the secondary memory package on a second memory device, the second memory device being a separate memory device from the first memory device and the second memory device having characteristics that are different from characteristics of the first memory device; and
    determining when the temperature on the storage device returns to a predefined operational level, transferring data from the secondary memory package to the primary memory package, and resuming suspended operations on the primary memory package.

13. The method of claim 12, further comprising, wherein during thermal throttling, storing data on the secondary memory package in a single-layer cell format.

14. The method of claim 12, further comprising executing one or more reliability schemes on the secondary memory package.

15. The method of claim 12, further comprising transferring the data from the secondary memory package to the primary memory package using one of a valid data relocation scheme and blind data movement scheme.

16. The method of claim 12, wherein when the temperature exceeds the thermal temperature limit, the method comprises reading host data from the primary memory package and reading host data, that is not transferred from the secondary memory package to the primary memory package, from the secondary memory package.

17. The method of claim 12, further comprising powering down the secondary memory package when the temperature on the storage device is at a predefined operational level.

18. A non-transitory computer-readable medium for performing thermal throttling on a storage device while maintaining operational frequency and power, the non-transitory computer-readable medium to store one or more instructions, when executed by one or more processors of the storage device, may cause the one or more processors to:
receive instructions from a host and write data to a primary memory package on a first storage device;
monitor temperature of components on the first storage device and determine when the temperature exceeds a thermal temperature limit;
when the temperature exceeds a thermal temperature limit, suspend certain operations on the primary memory package and write host data to a secondary memory package on a second storage device, the second storage device being a separate storage device from the first storage device and the second storage device having characteristics that are different from characteristics of the first storage device; and
determine when the temperature on the storage device returns to a predefined operational level, transfer data from the secondary memory package to the primary memory package, and resume suspended operations on the primary memory package.

19. The non-transitory computer-readable medium of claim 18, further comprising, wherein during thermal throttling, storing data on the secondary memory package in a single-layer cell format.

20. The non-transitory computer-readable medium of claim 18, wherein when the temperature exceeds the thermal temperature limit, a processor reads host data from the primary memory package and reads host data, that is not transferred from the secondary memory package to the primary memory package, from the secondary memory package.

* * * * *